UNITED STATES PATENT OFFICE.

HORACE M. HEDDEN, OF WORCESTER, MASSACHUSETTS, ASSIGNOR, BY MESNE ASSIGNMENTS, TO HIMSELF, C. A. HILL, JOHN DEAN, AND ENEAS MORGAN.

IMPROVEMENT IN FERROTYPE-PLATES AND FERROTYPES.

Specification forming part of Letters Patent No. 100,291, dated March 1, 1870; reissue No. 6,982, dated March 7, 1876; application filed February 18, 1876.

*To all whom it may concern:*

Be it known that I, HORACE M. HEDDEN, of the city and county of Worcester and Commonwealth of Massachusetts, have invented a certain new and useful Improvement in Ferrotypes; and I do hereby declare that the following is a full, clear, and exact description of the same.

My improvement has reference to a particular mode of preparing or covering the iron plate upon which the sun-picture is taken, whereby a more life-like appearance is given to the latter, as will be hereafter explained.

Ferrotype-plates, as heretofore prepared, have been covered with a black varnish or japan, and manufacturers have vied with each other in their attempts to produce the richest and most perfect black covering or coating upon such plates, a black color having been considered, both by the trade and by photographers, as essential to the production of a good picture.

From a series of experiments, I have found that the above theory is incorrect, and that a ferrotype taken upon a plate prepared according to my invention, a chocolate or reddish-brown being substituted for the black color, is a better and more life-like picture than any ferrotype heretofore taken.

The plates of sheet-iron, when prepared according to my invention, are covered by a coating of india-red and linseed-oil, prepared as follows, for example:

Take twenty gallons of linseed-oil and fourteen pounds of india-red and boil them together until a thick paste-like substance is produced, and, when cold, reduce the same with twenty gallons of benzole.

The composition thus produced is applied to the surface of the plates in the ordinary manner of preparing plates with black japan, and therefore does not require further description.

The flesh-like appearance given to the color of the plate by use of india-red renders the picture taken thereon more life-like and natural than pictures taken on black plates. There is a delicate shading, both to the drapery and to the outlines of the picture, which is not produced when the black plate is used, and which appears in striking contrast with the sharp and harsh expression produced by the black-colored plate.

I am aware that "melainotype" plates have been prepared with a varnish composed of a lamp-black base, varied by the introduction of other coloring matter, an illustration of which is found in the patent to Smith dated February 19, 1856.

I do not claim preparing ferrotype-plates by such process, but, on the contrary, I dispense entirely with the lamp-black base, which has heretofore, in all instances, been deemed indispensable.

Having thus described my improvements in ferrotype-plates and ferrotypes, what I claim to be new and of my invention, and desire to secure by Letters Patent, is—

1. A ferrotype-plate covered by a coating composed of linseed oil and india-red, substantially as and for the purpose set forth.

2. A ferrotype, when taken upon a reddish-brown or chocolate-colored plate, prepared substantially as described.

HORACE M. HEDDEN.

Witnesses:

GEORGE M. HEDDEN,

GEO. H. RANOUSE.